United States Patent [19]

Yoshida et al.

[11] Patent Number: 5,533,166

[45] Date of Patent: Jul. 2, 1996

[54] METHOD FOR CALCULATING SPEED ESTIMATED VALUE IN SPEED CONTROL SYSTEM

[75] Inventors: Yasuhiro Yoshida; Yasuhiro Yamamoto, both of Tokyo, Japan

[73] Assignee: Kabushiki Kaisha Meidensha, Tokyo, Japan

[21] Appl. No.: 397,859

[22] Filed: Mar. 2, 1995

[30] Foreign Application Priority Data

Mar. 3, 1994 [JP] Japan ................................. 6-032738

[51] Int. Cl.$^6$ ........................................................ H02P 5/17
[52] U.S. Cl. ...................... 388/811; 388/904; 388/906; 388/907.5; 388/930; 318/599; 318/602; 318/609; 318/432
[58] Field of Search ........................ 388/809–815, 388/907.5, 904, 906, 930; 318/599–603, 606, 609, 611, 615–618, 632, 684, 807, 810, 811, 432, 433

[56] References Cited

U.S. PATENT DOCUMENTS

| 5,325,460 | 6/1994 | Yamada et al. | 388/811 |
| 5,334,923 | 8/1994 | Lorenz et al. | 318/805 |
| 5,476,158 | 12/1995 | Mann et al. | 318/807 X |

*Primary Examiner*—Bentsu Ro
*Attorney, Agent, or Firm*—Foley & Lardner

[57] ABSTRACT

A method for calculating a speed estimated value in a speed control system, comprises the steps of: (a) storing the number of speed detection pulses obtained at each interval of a speed control process and time that the speed detection pulse was obtained; (b) calculating a detection speed from the number of latest speed detection pulses and its detection time, and the number of the previously stored speed detection pulses and its detection time; (c) executing an averaging process of motor model output corresponding to time that the detection speed was obtained; (d) obtaining a difference between an output obtained at said step (c) and the detection speed; (e) executing a calculation of a load torque estimation by multiplying the difference of the step (d) by an observer gain; (f) executing an estimation of a motor speed for next processing from the difference of the step (d) and a difference between the detection speed and the motor model output; (g) calculating an output of a speed amplifier by constituting the speed amplifier by a proportion element and from a speed estimated value obtained in the step (f); (h) obtaining a torque command by summing the speed amplifier and the load torque estimated value; and (i) outputting the torque command of the step (h) at a start point of the next speed control interval. Therefore, an output time of the torque command becomes clear, and the estimated value of the motor speed at a correct time can be obtained.

5 Claims, 7 Drawing Sheets

5,533,166

METHOD FOR CALCULATING SPEED ESTIMATED VALUE IN SPEED CONTROL SYSTEM

BACKGROUND OF THE INVENTION

1. Field of the Invention

The present invention relates to improvements in a method for calculating a speed estimated value in a speed control system of a motor.

2. Description of the Background Art

U.S. Pat. No. 5,325,460 discloses a calculation process for a speed estimation in a speed control system. Such speed estimation process is arranged to estimate a speed of a motor under an extremely low speed condition such that information of speed detection is not obtained by each speed control calculation, by means of a speed estimation observer. FIG. 5 shows a control block diagram of such a speed estimation observer. In FIG. 5, the speed estimation observer is enclosed by two-dot chain line, a reference mark (i) indicates that a mark with (i) is related to a speed control period (interval), and reference mark (j) indicates that a mark with the mark (j) is related to a speed detection period (interval). A deviation detector 11 receives a torque command $\tau_M^*(i)$ and a load torque estimated value $\hat{\tau}_L(j)$. The deviation output is supplied to a first calculating block 12. The first calculating block 12 includes a division block 12a in which the speed control period $T_{ASR}$ is divided with a motor inertia $T_M^*$, an integrator 12c and an adder 12b which adds an output of the division block 12a to an output of the integrator 12c.

The model output estimated value $\hat{n_M'}(i)$ derived by the first calculating block 12 is supplied to an averaging process calculating block 13. The averaging process calculating block 13 derives the average value during the pulse intervals and outputs the calculated result denoted by $\overline{n_M'}(j)$ to a plus input end of a first deviating block 12. A minus input end of a first deviating block 14 receives a detected speed value $\overline{n_M}(j)$ of the speed detection output detected by a pulse encoder 15.

The deviation output of the first deviating block 14 is supplied to an observer gain block 16 which provides a predetermined (generally proportional) gain for the input deviation value to output a load torque estimated value $\hat{\tau}_L(j)$. In addition, the deviation output of the first deviating block 14 is supplied to a minus input end of a second deviating block 17. A plus input end of the second deviating block 17 receives the model output estimated value $\hat{n_M'}(i)$. The second deviating block 17 outputs the speed estimated value $\hat{n_M}(i)$. The speed estimated value $\hat{n_M}(i)$ and the speed set value $n_M^*(i)$ are supplied to the minus input end and plus input end of a third deviating block 18. The deviation output of the third deviating block 18 is supplied to a speed amplifier 19 having a proportional gain KWC. An adder 20 adds the output of the speed amplifier 19 to the load torque estimated value $\hat{\tau}_L(j)$ to derive the motor torque command $\tau_M^*$. The motor torque command $\tau_M^*$ is supplied to a fourth deviating block 21 to derive the deviation from the load torque and is supplied to the motor i.e., a motor model block 22.

The deviation between the motor torque command $\tau_M^*$ and load torque estimated value $\hat{\tau}_L(i)$ is integrated by means of the motor inertia $T_M^*$ to derive the model output estimated value $\hat{n_M'}(i)$. Next, the average value $n_M'(i)$ at the pulse interval is derived from the value $\hat{n_M'}(i)$. Further, the deviation of $n_M'(j)$ from the average value speed $n_M(j)$ during the change of pulses is calculated. This deviation is multiplied by the observer gain (g) to derive a load torque estimated value $\hat{\tau}_L(i)$. Thereafter, when the deviation between the observer model output $n_M'(i)$ and the output of the first deviating block 14 is subtracted to estimate the speed during the pulses so that the estimated speed $n_M(i)$ is derived. The value of $n_M(i)$ is supplied to the speed amplifier 19 as a feedback signal to carry out the speed control for the motor. It is noted that the load torque estimated value $\hat{\tau}_L(i)$ is added to the output of the speed amplifier 19 by the adder 20 to derive the torque command so that a disturbance on the load can be suppressed.

In the above-mentioned calculating method of a speed estimation observer, there are two methods of an interruption process executed during the speed detection calculating period, and a process executed during intervals of speed control period. Assuming that the present time is (i), in an interval process of the time (i), which is indicated by a reference character B in FIG. 6 and shown by a flowchart of FIG. 8, the speed estimated value $\hat{n_M}(i)$ is calculated from the detected speed $n_M(j)$ calculated by the an interruption processing indicated by a reference character A of FIG. 6 and a torque command $\tau_M^*(i-1)$ calculated in the interval processing. The torque command $\tau_M^*(i)$ to be outputted at the time (i) is calculated from the speed estimated value $\hat{n_M}(i)$ and the load torque estimated value $\hat{\tau}_L(j)$. In FIG. 6, a mark x denotes motor model output, a mark o denotes a motor model speed estimated value. A reference character C denotes a motor actual speed, and SDP denotes a speed detection pulse.

As shown in FIG. 7, at a step S610 a detected speed $n_M(j)$ with respect to a speed detection pulse (j) is calculated and stored. Following this, at a step S620 an averaging process of the motor model output is executed and at a step S630 the load torque estimated value $\hat{\tau}_L(j)$ is calculated and stored. In FIG. 8, at a step S710, the motor model output estimated value $n_M'(i)$ is calculated from the torque command $\tau_M^*(i-1)$. Then, at a step S720, an averaging process is executed. At a step S730, the speed estimated value $\hat{n_M}(i)$ at the time (i) is calculated. At a step S740 a speed amplifier torque command calculation for outputting a motor torque command at the time (i) is executed. At a step S750 the torque command is calculated from the load torque estimated value and the speed amplifier output.

However, the calculation of the speed estimation at the time (i) is executed on the basis of the torque command $\tau_M^*(i-1)$ calculated at the previous interval (i-1). When the speed estimated value $\hat{n_M}(i)$ at the time (i) is calculated, the torque command $\tau_M^*(i-1)$ is regarded as outputted at the time (i-1). That is to say, the actual output time of the torque command $\tau_M^*(i-1)$ is a moment after the speed control calculation at the time (i-1). Accordingly, the actual motor speed is changed slightly after the time (i-1) upon receiving the torque command $\tau_M^*(i-1)$, as indicated by arrows in FIG. 6. Consequently, the speed estimated value obtained by the above system tends to generates a slightly offset from the actual speed as shown by a dashed line indicative of the speed estimated value and a solid line indicative of the actual speed.

SUMMARY OF THE INVENTION

It is an object of the present invention to provide a method for calculating a speed estimated value in a control system which method provides an speed estimated value on actual time without generating offset to the actual speed.

A method according to the present invention is for calculating a speed estimated value in a speed control system and comprises the steps of: (a) storing the number of speed detection pulses obtained at each interval of a speed control process and time that the speed detection pulses was obtained; (b) calculating a detection speed from the number of latest speed detection pulses and its detection time, and the number of the previously stored speed detection pulses and its detection time; (c) executing an averaging process of motor model output corresponding to time that the detection speed was obtained; (d) obtaining a difference between an output obtained at the step (c) and the detection speed; (e) executing a calculation of a load torque estimation by multiplying the difference of the step (d) by an observer gain; (f) executing an estimation of a motor speed for next speed control interval from the difference of the step (d) and a difference between the detection speed and the motor model output; (g) calculating an output of a speed amplifier by constituting the speed amplifier by a proportion element and from the speed estimated value obtained in the step (f); (h) obtaining a torque command by summing the speed amplifier and the load torque estimated value; and (i) outputting the torque command of the step (h) at a start point of the next speed control interval.

DETAILED DESCRIPTION OF THE INVENTION

Referring to drawings, there is shown an embodiment of a method and system for processing a speed estimating calculation in a speed control system according to the present invention.

Figure 2:
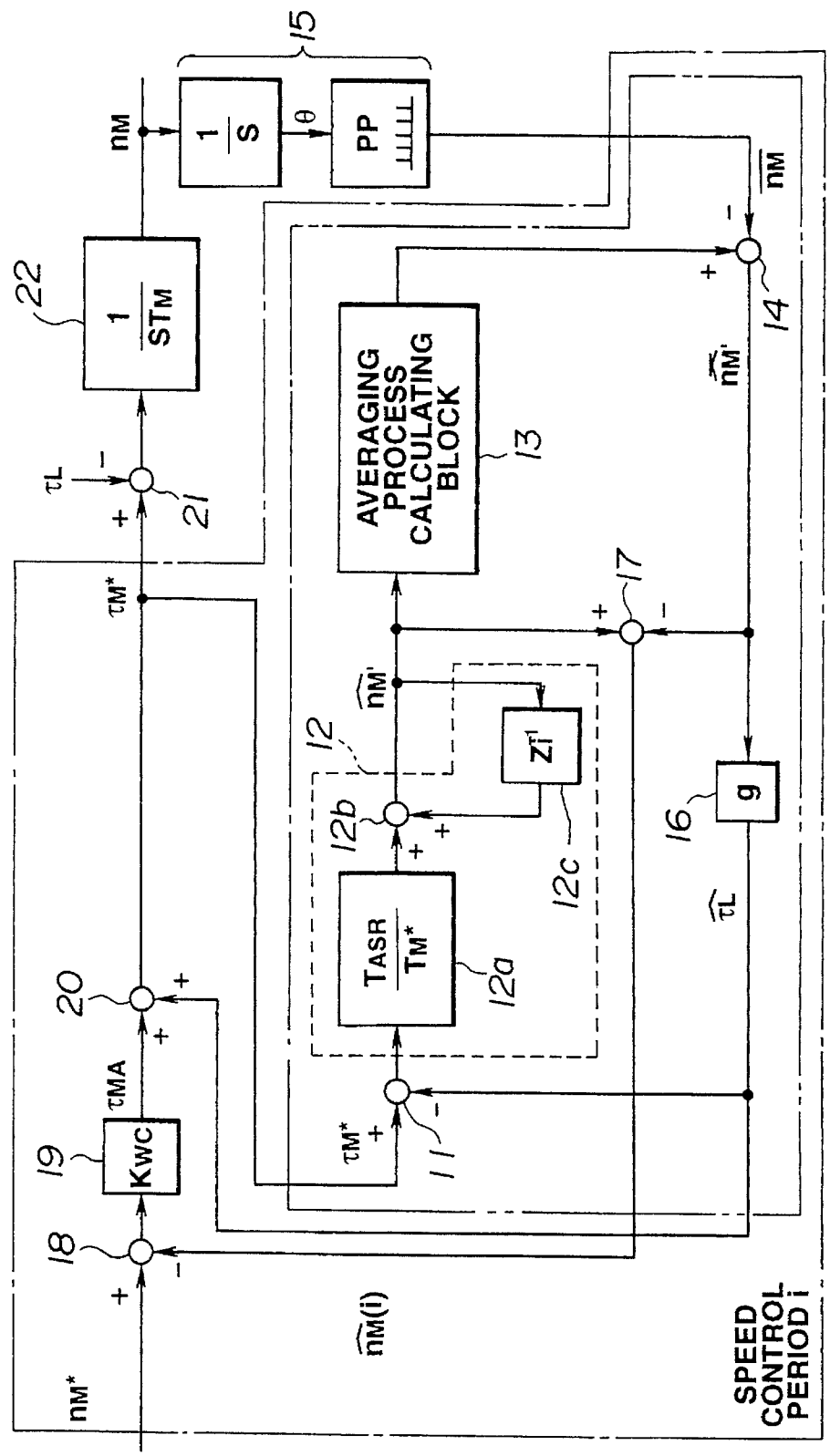
FIG. 2 is a control block diagram of a speed estimating system according to the present invention.
Figure 5:
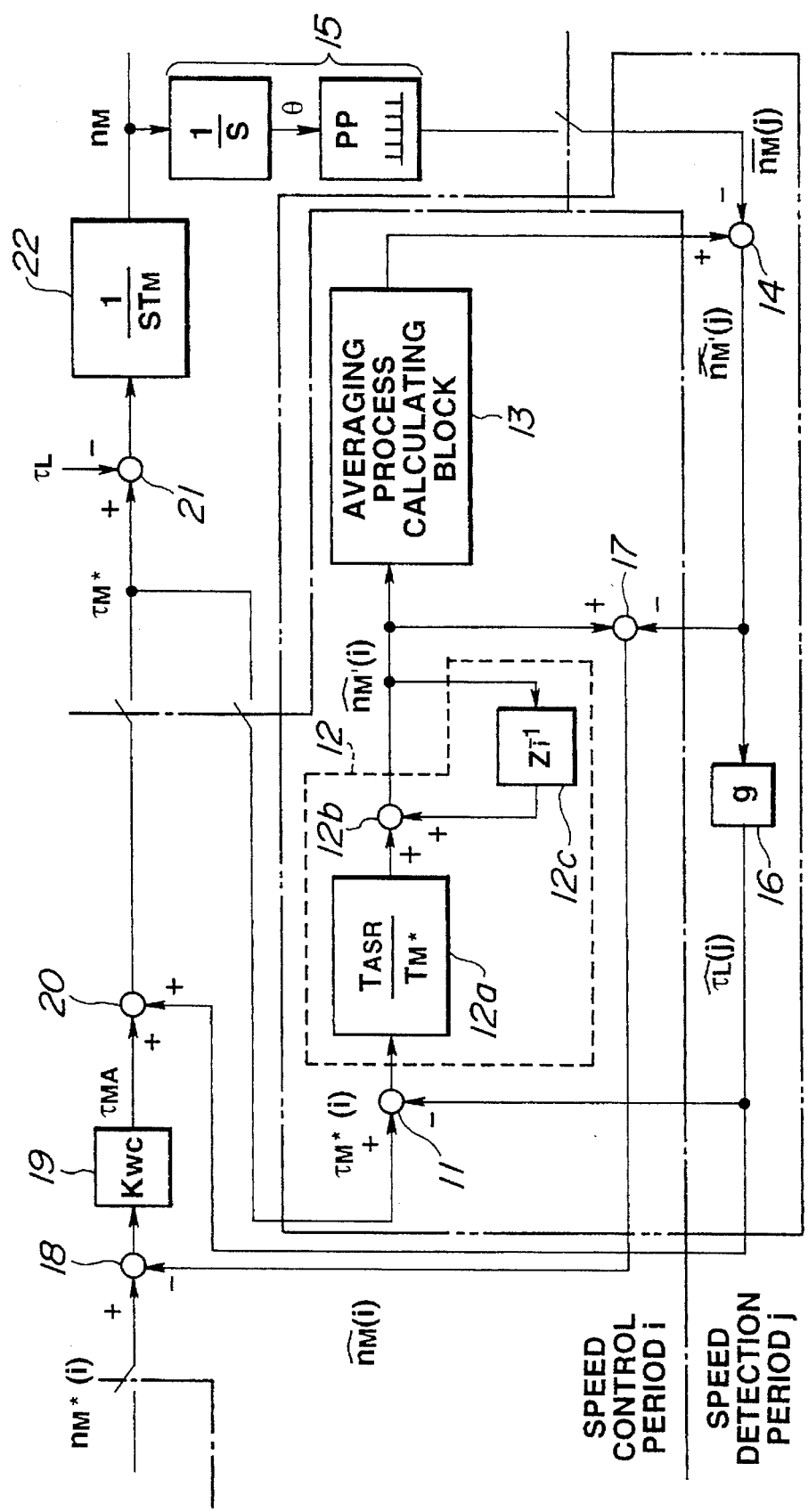
FIG. 5 is a control block diagram of a conventional speed estimation observer.
Figure 6:
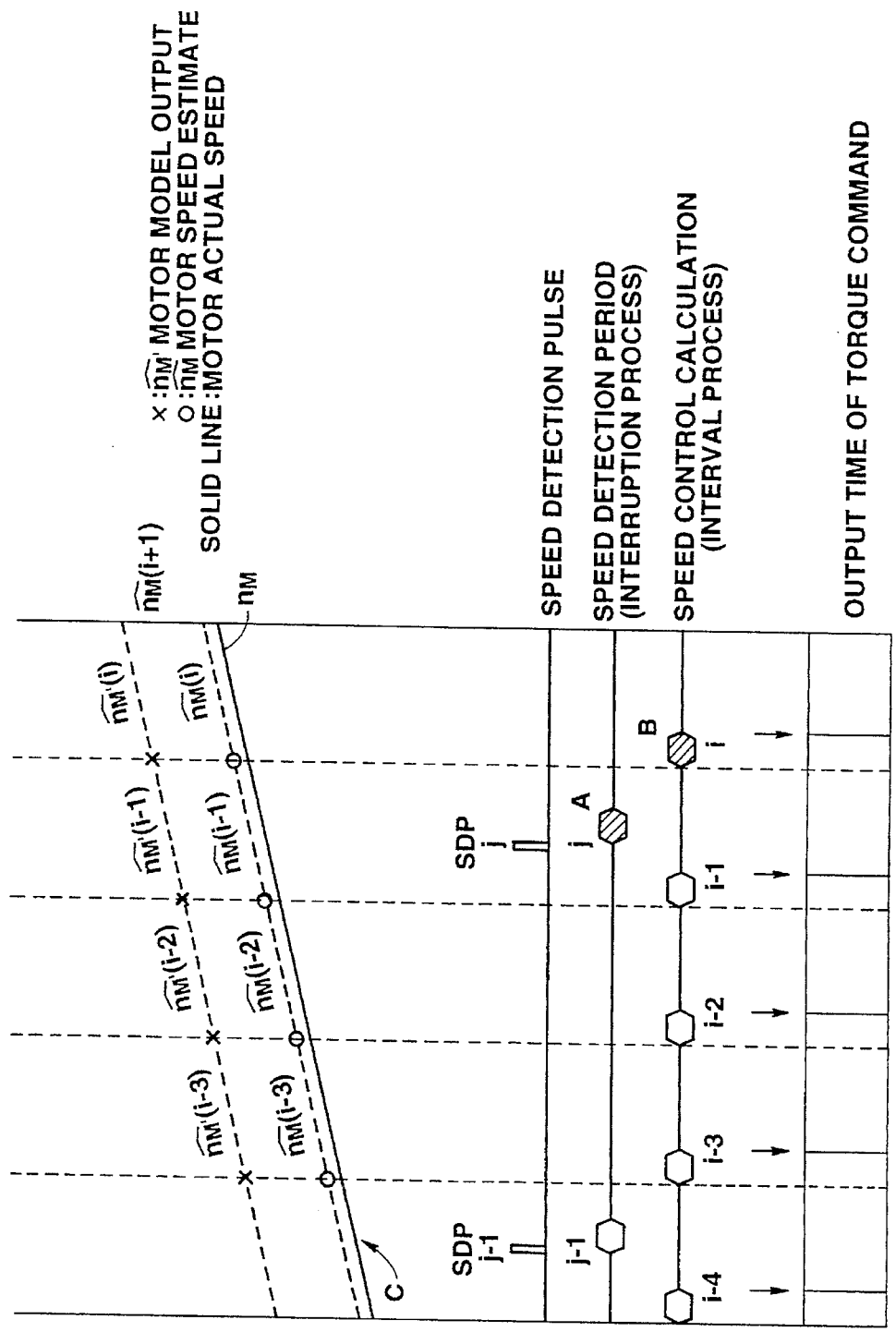
FIG. 6 is a view for explaining a conventional operation of a motor under an extremely low speed.
Figure 7:
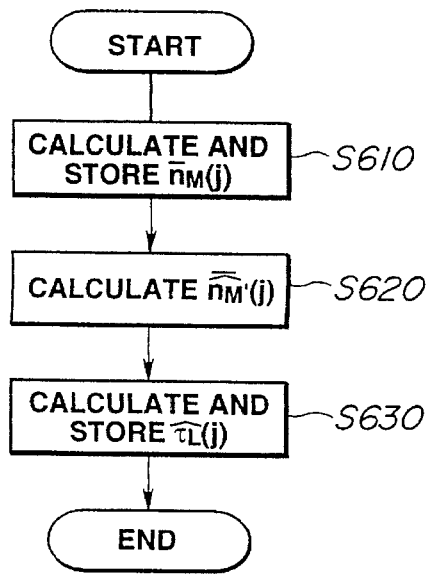
FIG. 7 is a flowchart which shows an interrupting process for the speed detection.
Figure 8:
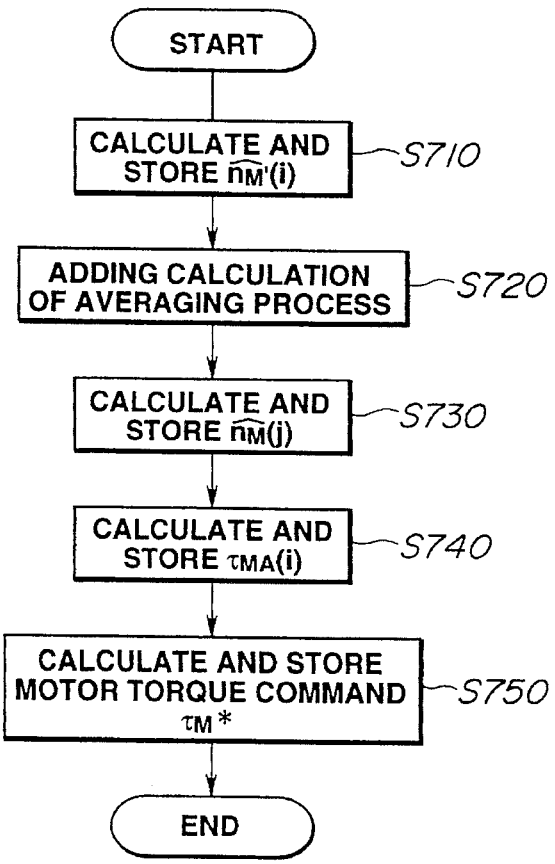
FIG. 8 is a flowchart which shows an interval process for the speed control.

As shown in FIG. 2, the basic construction of the estimating system according to the present invention is generally similar to that of FIG. 5 except that the first deviating block 14 is arranged to receive the averaging process calculation value $\widehat{\overline{n_M}}$ and the detected speed value $\overline{n_M}$ so that an interruption calculation of a speed detection (detection of $\overline{n_M}$) is carried out during an interval processing of the speed control. That is, according to the present invention, as shown in FIG. 2, the processing of the first deviating block 14 and the observer gain block 16 are executed during the speed control interval. Since the basic construction of the other blocks of the embodiment according to the present invention is similar to that of the prior art shown in FIG. 5, the explanation thereof is eliminated in this section.

Figure 1:
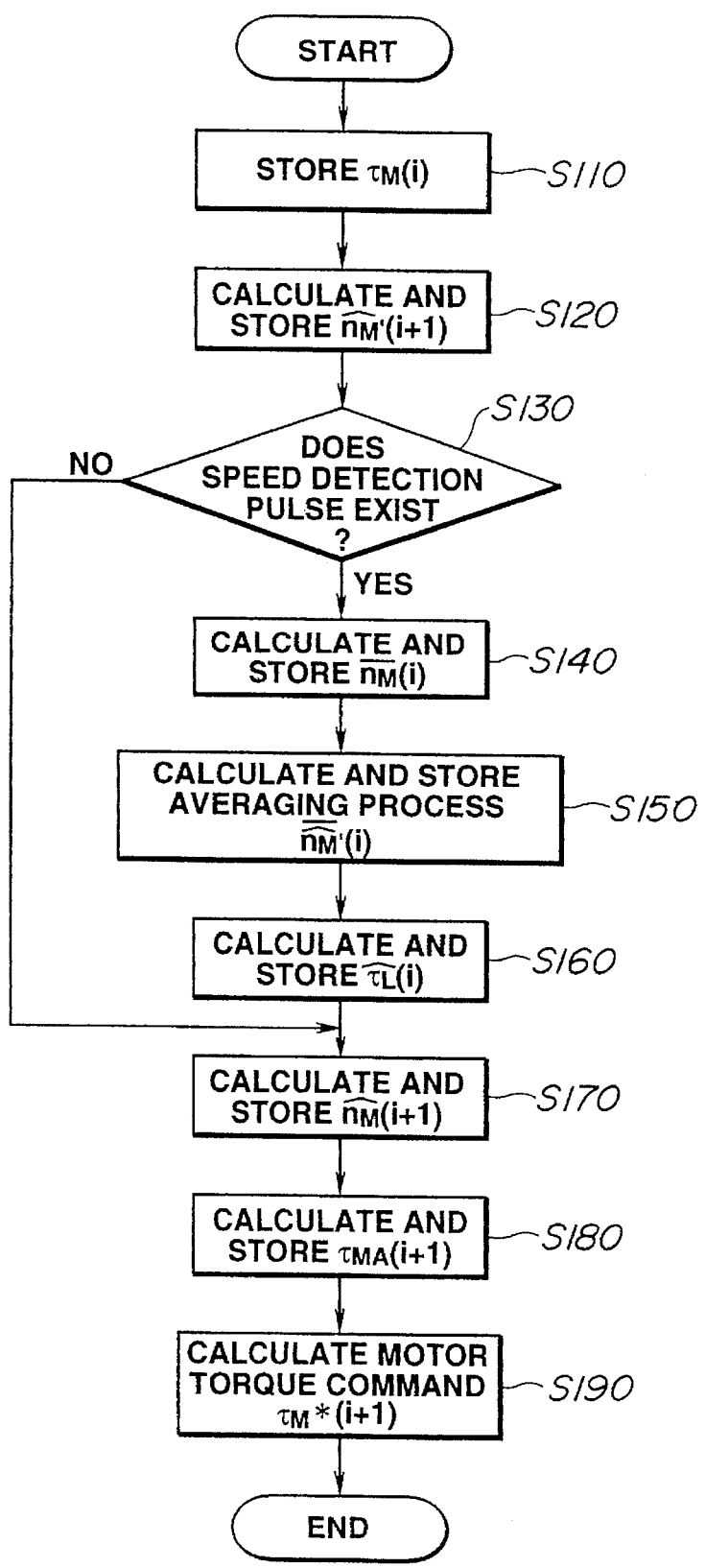
FIG. 1 is a flowchart of an embodiment of a method for calculating a speed estimation according to the present invention.

FIG. 1 shows a flowchart which indicates an estimating procedure of the embodiment of the method for processing a speed estimating calculation according to the present invention. The manner of operation of the method according to the present invention will be discussed hereinafter, with reference to a case of a motor operated under an extremely low speed.

As shown in FIG. 1, in a step S110, a torque command $\tau_M^*(i)$ to be outputted at time (i) has previously been calculated, and the torque command $\tau_M^*(i)$ is outputted at the time (i) and is stored, wherein the time (i) is present interval processing time.

In a step S120, a motor model output. $\widehat{n_M}(i+1)$ at time (i+1) is calculated from the torque command $\tau_M^*(i)$ and is stored.

In a step S130, it is judged whether a speed pulse exists or not. When the speed pulse exists, the routine proceeds to a step S140 wherein the calculation for the speed detection is executed, and the calculated result $\overline{n_M}(i)$ is stored. Following this, the routine proceeds to a step S150 wherein the calculation of the averaging process of the motor model output $\widehat{n_M}(i)$ is executed, and the calculated result $\widehat{\overline{n_M}}(i)$ is stored.

In a step S160 an estimated value $\hat{\tau}_L(i)$ of the load torque is calculated upon obtaining a difference between the averaging process output $\widehat{\overline{n_M}}(i)$ in the step S150 and the detection speed obtained $\overline{n_M}(i)$ in the step S140.

In a step S170 a motor speed estimated value $\widehat{n_M}(i+1)$ is calculated from the calculated value $\hat{\tau}_L(i)$ of the step S160 and the motor model output $\widehat{n_M}(i+1)$ by means of a predicted motor speed calculation, and is stored.

In a step S180 a speed amplifier output $\tau_{MA}(i+1)$ at the time (i+1) is calculated from the calculated value $\widehat{n_M}(i+1)$ of the step S170 and is stored.

In a step S190 a motor torque command $\tau_M^*(i+1)$ is calculated from the output $\tau_{MA}(i+1)$ of the step S180 and the load torque estimate $\hat{\tau}_L(i)$. In the step S190, since the torque command is not outputted, the calculated value is not stored.

Figure 4:
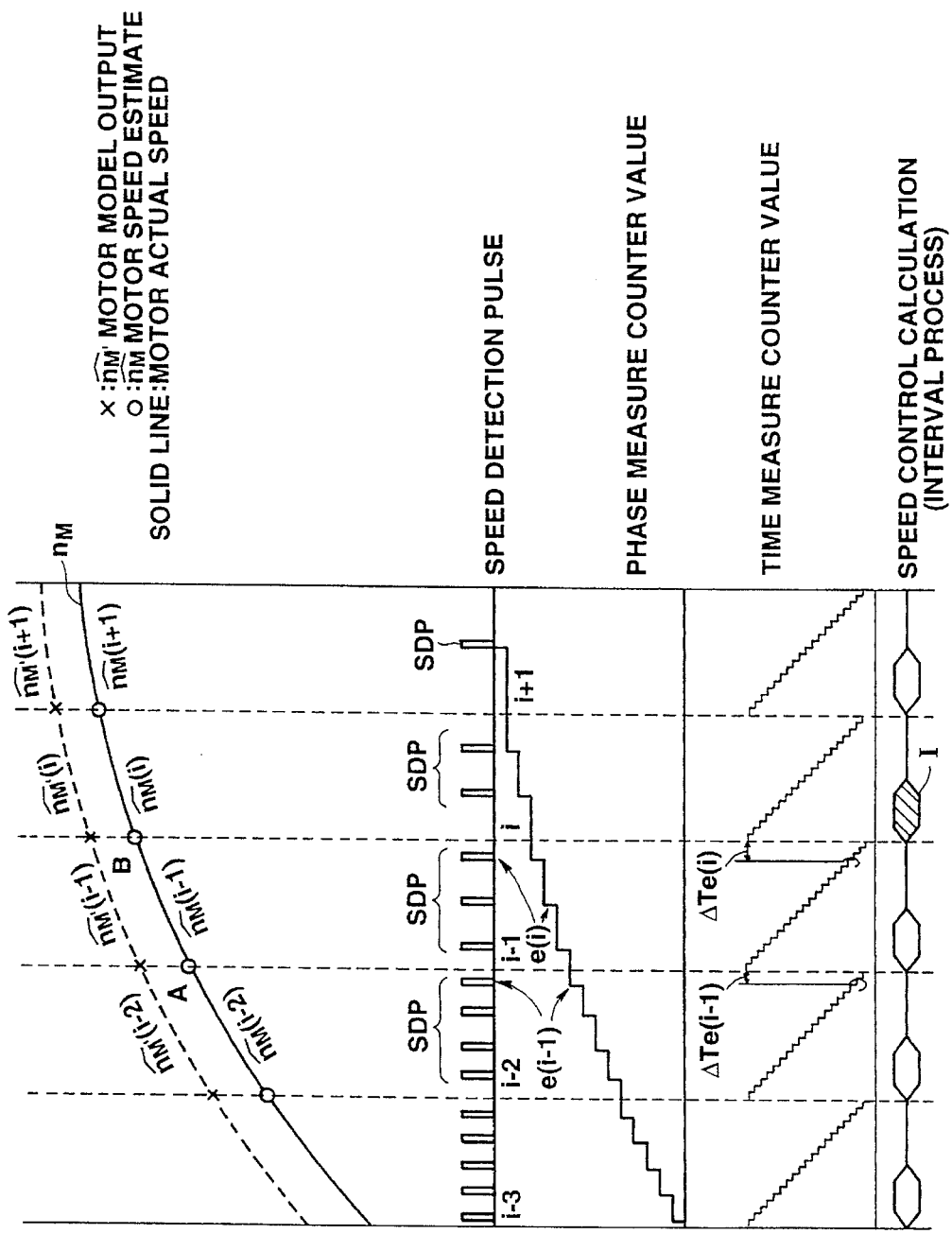
FIG. 4 is a view for explaining an operation of the motor under a normal state.

When in the step S130 the speed pulse does not exist, the routine jumps to the step S170. That is, the motor model output $\widehat{n_M}(i+1)$ obtained in the step S120 is used for the calculation of the motor speed estimated value $n_M(i+1)$. As data corresponding to the output of the first deviation block 14 of FIG. 4, the value obtained in the previous speed detection have been stored and is used.

As mentioned above, by outputting the torque command $\tau_M^*(i)$ at the time (i), it becomes possible to predictingly calculate the motor speed estimated value $\hat{n}_M(i+1)$ at the time $(i+1)$ that is a future moment with respect to that of the output of the torque command $\tau_M^*(i)$. Accordingly, if the next motor speed estimated value $\hat{n}_M(i+1)$ is obtained, it becomes possible to calculate the torque command $\tau_M^*(i+1)$ to be outputted at the time $(i+1)$.

Figure 3:
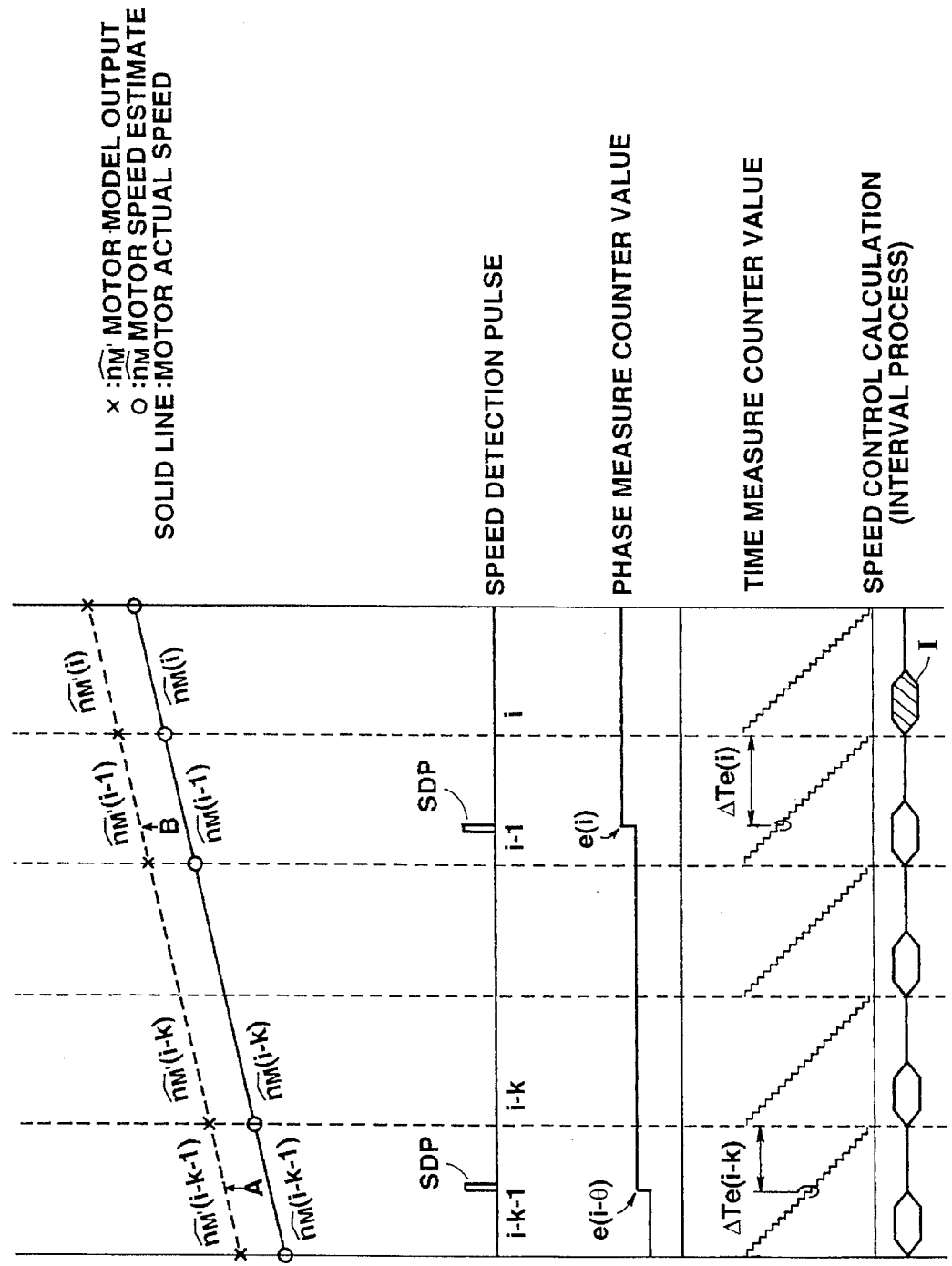
FIG. 3 is a view for explaining an operation of a motor under an extremely low speed.

Further, by executing the calculations as mentioned above, the output time of the torque command becomes clear, and therefore the time relationship of the speed estimating (predicting) calculation executed on the basis of the torque command corresponds to the time relationship of the actual motor speed varied by the torque command. This enables the speed estimation to be executed at correct time. Although FIG. 2 shows a case under an extremely low speed, the above mentioned calculation can be applied to a case shown in FIG. 3 which indicates a normal operating condition. In FIGS. 2 and 3, a mark x denotes the motor output model, a mark o denotes the motor speed estimated value, a solid line denotes the motor actual speed, SDP denotes a speed detection pulse, $e(i)$ and $e(i-k)$ denote latest phase count data of the phase measure count value, $\Delta Te(i)$ and $\Delta Te(i-k)$ denote time measure count values which indicate at the respective detected time of $e(i)$ and $e(i-k)$, and I denotes; a speed control calculated value at the time $(i)$.

The calculating method of the speed detection will be discussed hereinafter. The method of the speed detection is executed by previously storing the number of speed detection pulses obtained at each interval of the speed control processing and the time when the latest detected pulse was obtained, and by calculating the detected speed from the previously stored number of the speed detection pulses, its time, the number of the latest detection speed pulses and its time. The equation, which is applied in case that the speed detection pulse is not obtained by each speed control period, is obtained as follows:

$$\overline{n_M}(i) = K_{PP} \frac{e(i) - e(i-k)}{\Delta Te(i-k) + kT_{ASR} - \Delta Te(i)} \quad (1)$$

wherein $K_{pp}$ is a translation coefficient of speed calculation value, and $k-1$ is a frequency of cases that no speed detection pulse exists.

Further, in case that the speed detection pulse is obtained by each speed control interval, the speed detection is calculated by the following equation (2) which is obtained by inputting a condition $k-1=0$ to the equation (1).

$$\overline{n_M}(i) = K_{PP} \frac{e(i) - e(i-1)}{\Delta Te(i-1) + T_{ASR} - \Delta Te(i)} \quad (2)$$

Next, the calculation of the averaging process of the motor model output will be discussed. The averaging process of the motor model output is executed when the latest speed detection pulse is updated by each speed control period. FIG. 2 shows a relationship between the motor model output and the speed detection pulse. At the time $(i)$ of FIG. 2, since it has been already known that the speed detection pulse at $e(i)$ has been obtained, the averaging process is executed as to the motor model output from the time $(i-k)$ that the speed detection pulse $e(i-k)$ has been obtained until the time $(i)$ that the speed detection pulse $e(i)$ has been obtained. That is, with respect to data within a period from a reference mark A to a reference mark B in FIG. 2, the averaging process is executed. The averaging process is executed by the following equation (3):

$$\overline{\hat{n}_{M'}}(i) = \frac{\frac{\hat{n}_{M'}(i-k-1) + \hat{n}_{M'}(i-k)}{2} \times \Delta Te(i-k)}{\Delta Te(i-k) + kT_{ASR} - \Delta Te(i)} + \frac{\frac{\hat{n}_{M'}(i-k) + \hat{n}_{M'}(i-k+1)}{2} \times T_{ASR}}{\Delta Te(i-k) + kT_{ASR} - \Delta Te(i)} + \ldots + \frac{\frac{\hat{n}_{M'}(i-1) + \hat{n}_{M'}(i)}{2} \times (T_{ASR} - \Delta Te(i))}{\Delta Te(i-k) + kT_{ASR} - \Delta Te(i)} \quad (3)$$

If this equation (3) is applied to a case shown in FIG. 3, it may assume that $k-1=0$. Therefore, the equation (3) can be modified as follows.

$$\overline{\hat{n}_{M'}}(i) = \frac{\frac{\hat{n}_{M'}(i-2) + \hat{n}_{M'}(i-1)}{2} \times \Delta Te(i-1)}{\Delta Te(i-1) + T_{ASR} - \Delta Te(i)} + \frac{\frac{\hat{n}_{M'}(i-1) + \hat{n}_{M'}(i)}{2} \times (T_{ASR} - \Delta Te(i))}{\Delta Te(i-1) + T_{ASR} - \Delta Te(i)} \quad (4)$$

It will be fully appreciated by those skilled in the art that the foregoing description has been made to the preferred embodiment and various changes and modifications may be made without departing from the scope of the present invention which is to be defined by the appended claims.

What is claimed is:

1. A method for processing a speed estimating calculation in a speed control system, comprises the steps of:
   (a) storing the number of speed detection pulses obtained at each interval of a speed control process and time that the speed detection pulses was obtained;
   (b) calculating a detection speed from the number of latest speed detection pulses and its detection time, and the number of the previously stored speed detection pulses and its detection time;
   (c) executing an averaging process of motor model output corresponding to time that the detection speed was obtained;
   (d) obtaining a difference between an output obtained at the step (c) and the detection speed;
   (e) executing a calculation of a load torque estimation by multiplying the difference of the step (d) by an observer gain;
   (f) executing an estimation of a motor speed for next control interval from the difference of the step (d) and a difference between the detection speed and the motor model output;
   (g) calculating an output of a speed amplifier by constituting the speed amplifier by a proportion element and from a speed estimated value obtained in the step (f);
   (h) obtaining a torque command by summing the speed amplifier and the load torque estimated value; and
   (i) outputting the torque command of the step (h) at a start point of the next speed control interval.

2. A method as claimed in claim 1, wherein when the speed detection is not obtained in the step (b), a torque command to be outputted at a start of the next interval is obtained by the following steps;
   (j) calculating a speed estimated value at the next interval from a difference between the previous detected speed and the averaged motor model output corresponding to the previous detected speed and a difference between the previous detected speed and the motor model output, (k) calculating an output of a speed amplifier by constituting the speed amplifier by a proportion element and from the speed estimated value obtained in the step (j), and (l) summing the output of the speed amplifier and the load torque estimated value.

3. A method as claimed in claim 1, wherein an output of an speed amplifier is calculated by the speed amplifier constituted by a proportional element and an integral element, and is outputted as a torque command at a start time of the next interval.

4. A method as claimed in claim 1, wherein an output of an speed amplifier is calculated by the speed amplifier constituted by a proportional element and an integral element, and the sum of the output of the speed amplifier and the load torque estimated value is outputted as a torque command at a start time of the next interval.

5. An estimating system for processing a speed estimating calculation in a speed control system, comprising:

a storing means for storing the number of speed detection pulses obtained at each interval of a speed control process and time that the speed detection pulses was obtained;

a calculating means for calculating a detection speed from the number of latest speed detection pulses and its detection time, and the number of the previously stored speed detection pulses and its detection time;

an averaging means for executing an averaging process of motor model output corresponding to time that the detection speed was obtained;

a deviating means for obtaining a difference between an output obtained at said averaging means and the detection speed;

a torque estimated value calculating means for executing a calculation of a load torque estimation by multiplying the difference of said deviating means by an observer gain;

a motor speed estimated value calculating means for executing an estimation of a motor speed for next processing from the difference of said deviating means and a difference between the detection speed and the motor model output;

an amplifier means for calculating an output of a speed amplifier by constituting the speed amplifier by a proportion element and from a speed estimated value obtained by said motor speed estimated value calculating means;

a torque command calculating means for obtaining a torque command by summing the speed amplifier and the load torque estimated value; and an torque command outputting means for outputting the torque command of said torque command calculating means at a start point of the next speed control interval.

* * * * *